United States Patent [19]

Hill

[11] Patent Number: 4,576,584
[45] Date of Patent: Mar. 18, 1986

[54] WILD TURKEY CALL
[75] Inventor: T. Don Hill, Platte County, Mo.
[73] Assignee: Ferguson Manufacturing, Inc., Richmond, Mo.
[21] Appl. No.: 565,584
[22] Filed: Dec. 27, 1983
[51] Int. Cl.⁴ .................. A63H 5/00; G10K 5/00; G10K 9/00
[52] U.S. Cl. .................. 446/193; 446/203; 446/420; 116/22 A; 116/137 R
[58] Field of Search .......... 116/137 R, 2, 22 A, 116/24, 144; 446/188, 192, 193, 213, 420, 202; 43/2; 272/14

[56] References Cited

U.S. PATENT DOCUMENTS

| | | | |
|---|---|---|---|
| 295,138 | 3/1884 | Worcester | 446/420 |
| 1,173,141 | 2/1916 | Bartholomae | 446/420 |
| 1,363,325 | 12/1920 | Kohn | 446/420 |
| 2,527,756 | 10/1950 | Megginson | 446/192 |
| 2,564,942 | 8/1951 | Wemmer, Sr. | 446/420 |
| 2,573,856 | 11/1951 | Malone, Sr. | 43/2 |
| 2,583,400 | 1/1952 | Wade | 446/188 |
| 2,988,848 | 6/1961 | Lemelson | 446/193 |
| 3,815,283 | 6/1974 | Piper | 446/202 |
| 3,968,592 | 7/1976 | Piper | 446/193 |
| 4,048,750 | 9/1977 | Wolfe | 446/193 |
| 4,380,134 | 4/1983 | Taluba et al. | 446/188 |

Primary Examiner—Charles Frankfort
Assistant Examiner—W. Morris Worth
Attorney, Agent, or Firm—Kokjer, Kircher, Bradley, Wharton, Bowman & Johnson

[57] ABSTRACT

A turkey call capable of realistically imitating both the gobbling and clucking sounds made by wild turkeys. A hollow body has an internal sound chamber covered at one end by a vibratile diaphragm. An air bulb is mounted on the opposite end of the body and can be squeezed to vary the gobbling sound produced by the diaphragm. A hammer and anvil mechanism in the sound chamber reproduces the clucking sounds made by wild turkeys and can be activated independently of the diaphragm.

15 Claims, 3 Drawing Figures

U.S. Patent  Mar. 18, 1986  4,576,584
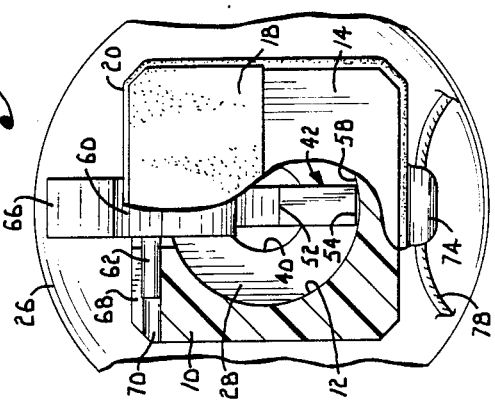
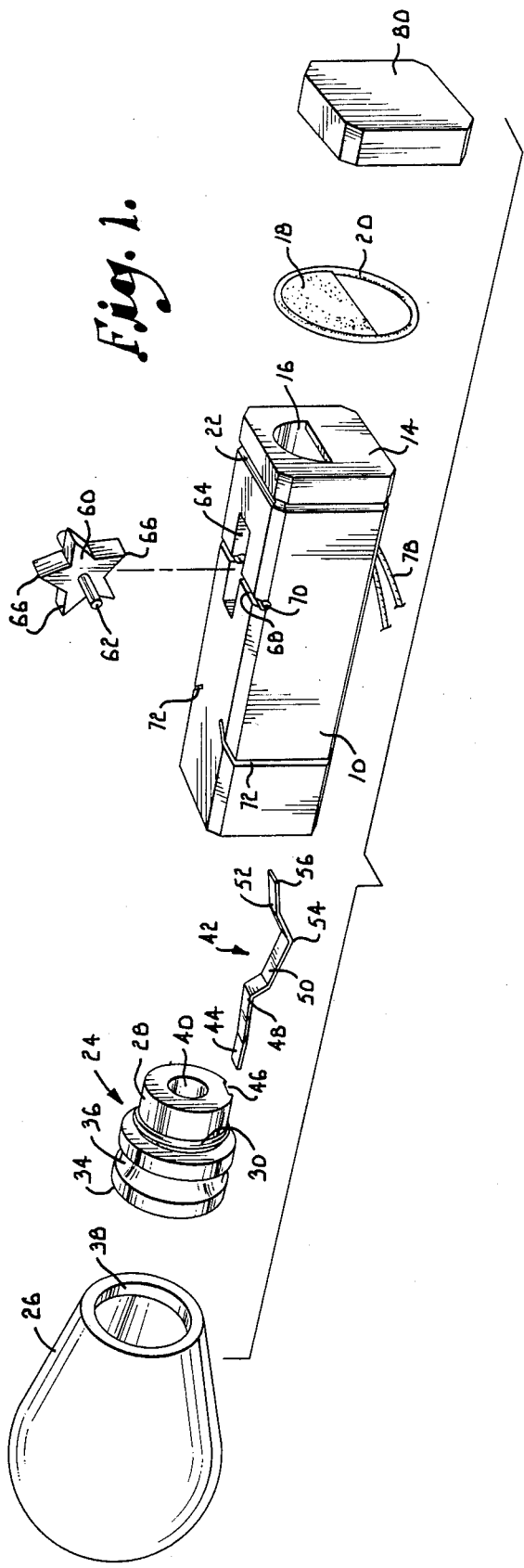
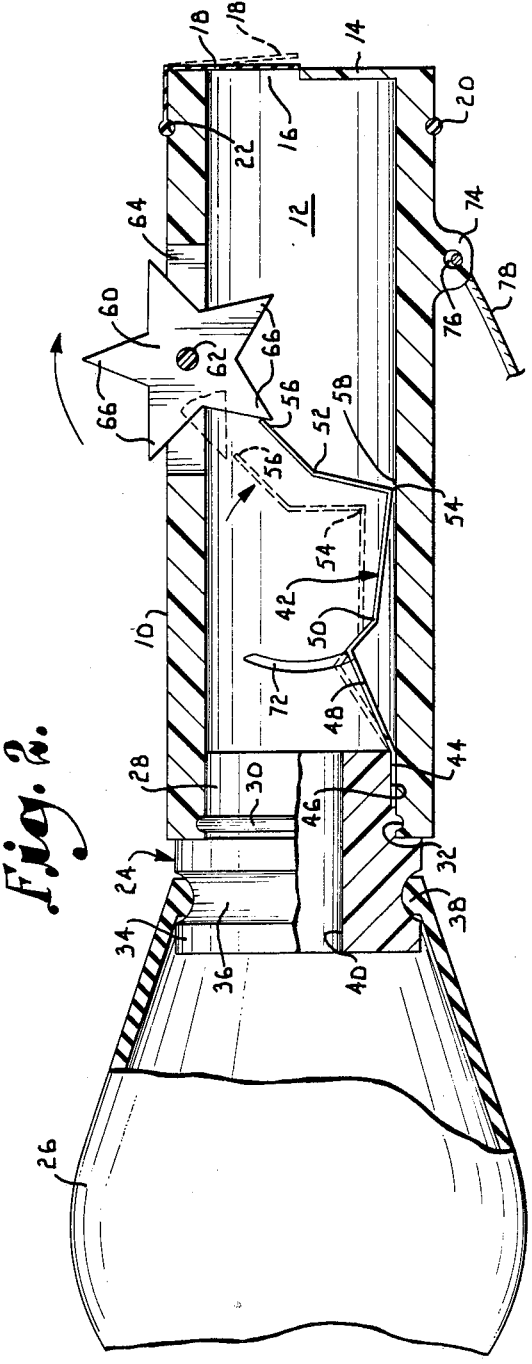

WILD TURKEY CALL

BACKGROUND AND SUMMARY OF THE INVENTION

This invention relates to a turkey call which realistically imitates the gobbling and clucking sounds made by wild turkeys.

It has long been recognized that the wild turkey is one of the most sly and elusive game birds and thus one of the most difficult birds to hunt. In order to successfully hunt wild turkeys, it is necessary for the hunter to exhibit great patience, stealth and silence and, perhaps most importantly, to accurately imitate the gobbling and clucking sounds to which the wild turkey responds.

Attempts have been made to develop devices which emit sounds that attract turkeys and other game birds in order to lure them within range. Typically, turkey calls have attempted to reproduce the characteristic gobble of the male turkey and the similar sounds made by the female turkey. Devices of this type normally include vibrating membranes or reeds which emit appropriate sound when activated. However, the devices that have been proposed in the past have not been particularly successful, due in large part to their inability to realistically imitate the gobbling sounds made by wild turkeys.

In addition to gobbling sounds, wild turkeys frequently emit clucking noises which normally accompany the other sounds they use to communicate. To my knowledge, none of the game calls that have been proposed in the past have been able to simulate these clucking sounds, either alone or along with gobbling sounds. Therefore, existing turkey calls have not been capable of imitating the full range of sounds made by wild turkeys, and their effectiveness has suffered accordingly. My invention is aimed primarily at providing an improved turkey call which realistically imitates the full range of sounds made by wild turkeys.

More specifically, it is an object of the present invention to provide a turkey call which accurately simulates the clucking sounds that are made by wild turkeys.

Another object of the invention is to provide a turkey call which is constructed and arranged to imitate the gobbling sounds of wild turkeys more realistically than the devices that have been proposed in the past. I have found that the use of a diaphragm in combination with a compressible air bulb produces a gobble sound that is particularly attractive to wild turkeys. The air bulb can be squeezed partially or fully and at virtually any desired rate to achieve a wide variation in the gobbling sounds that are produced.

A further object of the invention is to provide one turkey call in which gobbling and clucking sounds can be independently produced. This permits either type of sound to be generated alone or together with the other type of sound, and the versatility of the turkey call is thereby enhanced.

An additional object of the invention is to provide, in a turkey call of the character described, an arrangement which permits ready replacement of the diaphragms that serve to produce the gobble sounds.

Yet another object of the invention is to provide a turkey call of the character described which is simple and economical to construct and which is arranged to be conveniently held in the hand.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views:

FIG. 1 is an exploded perspective view of a wild turkey call constructed according to a preferred embodiment of the present invention;

FIG. 2 is a sectional view of the turkey call shown in FIG. 1 taken on a vertical plane, with the broken lines showing the moving parts in alternate positions; and FIG. 3 is an end elevational view of the turkey call taken from the right end of FIG. 2, with portions shown in section.

Referring now to the drawing in more detail, numeral 10 designates a hollow body forming part of a wild turkey call constructed in accordance with the present invention. The body 10 is square in section and preferably has beveled corners. By way of example, the body may have a length of approximately 5 inches and a width and height of approximately 1¾ inches so that it can be easily held in the hand. The body may be constructed of wood, rigid plastic or any other suitable material.

A sound chamber is formed within body 10 by a cylindrical cavity 12 which extends substantially the entire length of the body. The cavity 12 extends through the left end of body 10 as viewed in FIG. 2, and a thin end wall 14 is formed on the right end of the body to close the lower half of the cavity on its right end. A semicircular diaphragm opening 16 is formed in the end of the body above the end wall 14.

The diaphragm opening 16 is covered by a flexible vibratile diaphragm 18 which may be formed of latex rubber or any other suitable material. As best shown in FIG. 1, the diaphragm 18 has a semicircular shape and is large enough to cover opening 18. An enlarged beaded rim 20 is formed integrally with the diaphragm to permit it to be detachably mounted on the body 10. A groove 22 is formed in the exterior surface of body 10 at a location spaced from the end wall 14. The diaphragm 18 is applied to body 10 by inserting the rim 20 into the groove 22. This causes the diaphragm 18 to be tightly stretched and secures it in place covering the diaphragm opening 16 with one side of the diaphragm exposed to cavity 12 through the diaphragm opening. The diaphragm can be removed and replaced by another diaphragm by displacing the rib 20 from the groove 22. The end of the body 10 on which the diaphragm 18 is mounted forms a substantially square mouthpiece.

The opposite or left end of body 10 receives a spool 24 which serves to mount a compressible air bulb 26 on the body. The spool 24 has a cylindrical end portion 28 which is substantially equal in diameter to the body cavity 12. A rib 30 extends around end portion 28 of the spool and projects outwardly therefrom. The body 10 has an annular groove 32 formed in the wall surrounding cavity 12. As best shown in FIG. 2, the spool 24 is mounted on the end of body 10 by inserting the end portion 28 into cavity 12 until the rib 30 snaps into the groove 32.

Spool 24 has another end portion 34 which is somewhat larger than end portion 28. End portion 34 is located outside of the body 10 and is provided with a groove 36 which receives an annular bead formed on the open end of the air bulb 26. The fit of bead 38 in groove 36 secures the air bulb on spool 24. A cylindrical passage 40 extends through spool 24 to provide communication between the interior of the air bulb 26 and the cavity 12.

A hammer and anvil mechanism is mounted within body 10 to simulate the clucking sounds made by wild turkeys. A spring is formed by a metal (or plastic) strip 42 having a tab 44 on one end. The tab is inserted into a notch 46 which is formed in the end portion 28 of spool 24. The tab 44 fits tightly in notch 46 and is suitably fixed therein to hold the strip 42 in place in the cavity 12. The metal strip 42 also includes a leg portion 48 which extends at an angle from tab 44. Extending from the leg portion 48 is a bent arm portion 50 of strip 42. Extending from arm portion 50 is another bent arm portion 52 of the strip. The arm portions 50 and 52 intersect at a corner 54 of the strip which serves as the hammer of the hammer and anvil mechanism. Arm portion 52 of the metal strip terminates in a free end 56.

The internal spring force of the metal strip 42 urges it toward the position shown in solid lines in FIG. 2. When the strip is displaced to the broken line position, the internal spring force urges it to return to the solid line position. Immediately underlying the corner 54 is an anvil surface 58 formed interiorly of body 10 on the internal wall surface surrounding cavity 12. Alternatively, a metal or plastic plate or similar element may be secured to the internal wall surface surrounding the cavity in order to provide the anvil surface. In any event, the anvil surface 58 is struck by corner 54 when the metal strip 42 moves from the broken line position of FIG. 2 to the solid line position.

The hammer and anvil mechanism is activated by a star wheel 60. The star wheel 60 is rigidly mounted on a pin 62 which serves to mount the star wheel for rotation on body 10. The star wheel 60 extends through a rectangular opening 64 which is formed in the top of body 10 to permit transmission of sounds from cavity 12 to the exterior of the body. Star wheel 60 has a plurality of points or prongs 66 which serve as fingers acting against the free end 56 of the metal strip 42 to reciprocate its corner 54 between the solid and broken line positions of FIG. 2. The top of body 10 is provided with a slot 68 which leads to a somewhat larger cylindrical opening 70. the star wheel 60 is mounted for rotation by pressing pin 62 through the slot 68 and into the opening 70. Pin 62 is able to turn in opening 70 to accomodate rotation of the star wheel.

Each side of body 10 is provided with a tone slot 72 which extends from the exterior surface of the body and intersects with the cavity 12. The slots 72 serve as vents which relieve the excess pressure which builds up within cavity 12 when the air bulb 26 is squeezed. Each slot 72 is angled with respect to the longitudinal axis of cavity 12. The slots can be replaced by a series of apertures if desired.

The bottom of body 10 has a projecting lug 74. An opening 76 is formed through lug 74 to receive a string 78. The string 78 can be drawn around the neck of the user of the turkey call to facilitate carrying of the device.

A protective end cap 80 covers the diaphragm 18 when the turkey call is not in use. The end cap 80 can be slipped over the right end of the body 10 and is removed when the turkey call is to be used.

In use, the turkey call produces sounds which realistically imitate the gobbling and clucking sounds emitted by wild turkeys. The gobbling sound is produced by blowing on the end of the body which contains the vibratile diaphragm 18, thereby causing the diaphragm to vibrate. This vibration produces a sound within the sound chamber 12 which simulates the gobbling sound produced by wild turkeys. At the same time, the air bulb 26 can be squeezed to the extent and at the rate desired to modify the sound produced by the vibrating diaphragm. The use of the air bulb in conjunction with the diaphragm produces a more realistic gobbling sound than has been produced in the past by other turkey call devices. The air bulb provides control of the sound resulting from vibration of the diaphragm. The sounds that are generated within the cavity 12 are transmitted through the opening 64 to attract wild turkeys in the vicinity.

The clucking sounds produced by wild turkeys can be simulated by activating the hammer and anvil mechanism. When the star wheel 60 is turned in the directed indicated by the directional arrow in FIG. 2, the prongs 66 of the star wheel reciprocate the metal strip 42 between the broken line and solid line positions of FIG. 2. When a prong initially contacts the free end 56 of strip 42, it pulls the strip to the broken line position wherein the corner 54 of the strip is displaced from the anvil surface 58. Upon continued rotation of the star wheel, the free end 56 is released. When the prong has passed the free end 56 to release it, the internal spring pressure of strip 42 returns it to the broken line position, and this causes the corner 54 to strike against the anvil surface 58. This contact of the corner area 54 against surface 58 produces a clicking or clucking sound which realistically imitates the clucking sounds produced by wild turkeys. The rate at which successive clucking sounds are generated depends upon the rate of rotation of the star wheel 60. The prongs 66 of the star wheel pull the metal strip 42 a distance sufficient to produce a clearly audible clicking sound when the prong releases end 56. At the same time, the star wheel can be rotated by a relatively small force so that inordinate effort is not required to force the prongs 56 past the free end 56 of the metal strip. Thus, a series of clucking sounds is generated each time the star wheel is rotated.

In this manner, gobble sounds can be produced alone, clucking sounds can be produced alone, or clucking sounds and gobbling sounds can be produced together or interspersed with one another. Consequently, the turkey call is highly versatile in that it can produce a full range of sounds simulating all of the sounds made by wild turkeys. The intermittent pulses of air that result from squeezing of the air bulb 26 create back pressures on the diaphragm 18 which produce the realistic gobbling sounds. The excessive pressure that builds up when the bulb is compressed is relieved by the vent slots 72.

If the diaphragm 18 should become worn or if it is desired to replace the diaphragm with a different diaphragm in order to fit the individual preference of the user, the diaphragm can be removed by displacing its bead 20 from groove 22. The new diaphragm can be easily installed simply by fitting its bead 20 into the groove 22. When not in use, the protective end cap 80 shields the diaphragm and thereby extends its useful life. As an alternative to the metal strip 42, another type of spring loaded device can be used as the hammer of the mechanism.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A device for attracting game birds such as wild turkeys, said device comprising:
    a hollow body presenting a cavity therein and having opposite ends, said body having an opening permitting sound to be transmitted out of said cavity;
    a diaphragm on one end of said body, said one end of the body forming a mouthpiece to effect vibration of said diaphragm and said diaphragm having one side exposed to said cavity and being vibratile in response to blowing on the mouthpiece to produce sound in said cavity;
    an air bulb on the other end of said body, said bulb being compressible to pressurize said cavity to vary the sound produced therein by said diaphragm in a manner to simulate a gobbling sound of game birds;
    an anvil surface in said cavity, said anvil surface being a rigid surface which is rigid with said body;
    a spring element in said cavity having one end fixed to said body and an opposite free end, said spring element having a pair of arm portions which intersect between said ends to present at the point of intersection a sharp corner forming a hammer for generating a clucking sound simulating a clucking sound of game birds upon successively striking said anvil surface, said arm portions being oriented and arranged to remain out of contact with said anvil surface to avoid interfering with the sound generated by said hammer; and
    activating means for said hammer having a plurality of projecting fingers acting in succession on said free end of the spring element in a manner to displace the hammer from the anvil surface and to then release said free end to permit said spring element to successively strike the hammer against the anvil surface, thereby generating said clucking sound to attract game birds.

2. The device of claim 1, wherein said activating means comprises:
    a wheel mounted on said body for rotation; and
    said fingers projecting from said wheel and being engageable in succession with said free end of the spring element to pull said hammer away from the anvil surface when said wheel is rotated, each finger releasing said spring element upon continued rotation of said wheel to permit the hammer to strike the anvil surface under influence of said spring element.

3. The device of claim 1, including vent means in said body for relieving the pressure in said cavity when said air bulb is compressed.

4. The device of claim 1, including:
    a flexible diaphragm; and
    means for detachably mounting said diaphragm on said body with one side of the diaphragm exposed to said cavity to produce a sound therein simulating a sound of a game bird when the diaphragm is vibrated.

5. The device of claim 4, wherein:
    said body presents a diaphragm opening communicating with said cavity; and
    said detachable mounting means for said diaphragm comprises a groove in said body and a rim portion of said diaphragm, said rim portion fitting removably in said groove to mount said diaphragm on the body with said one side of the diaphragm covering said diaphragm opening.

6. A device for attracting game birds such as wild turkeys, said device comprising:
    a hollow body presenting a sound chamber therein, said body having opposite ends and an opening permitting transmission of sound out of the sound chamber;
    a mouthpiece on one end of said hollow body, said mouthpiece being accessible for application to a mouth;
    a diaphragm on said one end of said hollow body, said diaphragm vibrating upon application of pressure thereto in response to blowing on the mouthpiece to produce a sound in said sound chamber;
    an air bulb on the other end of said hollow body, said bulb being compressible to pressurize said sound chamber to vary the sound produced by the diaphragm in a manner to simulate a gobbling sound of game birds; and
    vent means in said body located between said opposite ends for venting the pressure in said sound chamber when said bulb is compressed.

7. The device of claim 6, wherein:
    said body has opposite sides;
    said vent means comprises a vent formed through each side of said body at a location between said opening in the body and said other end of the body.

8. The device of claim 7, wherein each vent is formed like a slot.

9. The device of claim 6, including:
    a groove on said body adjacent said one end thereof;
    a diaphragm opening in said one end of the body; and
    a rim portion of said diaphragm fitting removably in said groove to mount the diaphragm on said one end of the body with the diaphragm covering said diaphragm opening and one side of the diaphragm exposed to said sound chamber through the diaphragm opening.

10. The device of claim 6, including means for producing a clucking sound in said sound chamber simulating sounds made by game birds.

11. The device of claim 6, including:
    an anvil surface in said sound chamber;
    a hammer mounted in said sound chamber for reciprocating movement toward and away from said anvil surface, said hammer producing a clucking sound simulating sounds made by game birds upon striking said anvil surface;
    spring means for continuously urging said hammer toward the anvil surface; and
    means for moving said hammer away from said anvil surface and then releasing the hammer to permit striking of the hammer against said anvil surface under the influence of said spring means, thereby producing said clucking sound.

12. A turkey call for attracting wild turkeys comprising:
- a hollow body presenting a sound chamber therein and having a mouthpiece on one end thereof at an accessible location for application to a mouth, said body having an opening providing communication between said sound chamber and the exterior of the body for transmission of sound out of the chamber;
- a diaphragm on said one end of the body, said diaphragm having one side exposed to said sound chamber and being vibratile in response to blowing on said mouthpiece to produce a sound in said sound chamber;
- an air bulb on said body, said bulb being compressible to pressurized said sound chamber to vary the sound produced by the diaphragm in a manner to simulate the gobbling of a wild turkey; and
- means for generating a clucking sound in said sound chamber simulating the clucking sound of a wild turkey.

13. The device of claim 12, including vent means in said body between said opening and air bulb for relieving the pressure in said sound chamber when the air bulb is compressed.

14. The device of claim 12, wherein said generating means comprises:
- an anvil surface in said sound chamber;
- a hammer in said sound chamber operable to strike said anvil surface to produce a clucking sound simulating sounds made by game birds; and
- means for selectively activating said hammer to successively strike said hammer against said anvil surface to produce said clucking sound.

15. The device of claim 14, wherein said activating means comprises:
- spring means for continuously urging said hammer toward said anvil surface when displaced therefrom; and
- means for displacing said hammer from the anvil surface and then releasing the hammer for movement against said surface under the influence of said spring means.

* * * * *